(12) United States Patent
Komatsu et al.

(10) Patent No.: US 12,466,512 B2
(45) Date of Patent: Nov. 11, 2025

(54) BICYCLE OPERATION DEVICE

(71) Applicant: Shimano Inc., Osaka (JP)

(72) Inventors: Atsushi Komatsu, Osaka (JP);
Takehiko Nakajima, Osaka (JP);
Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 623 days.

(21) Appl. No.: 16/445,317

(22) Filed: Jun. 19, 2019

(65) Prior Publication Data
US 2019/0308687 A1 Oct. 10, 2019

Related U.S. Application Data

(63) Continuation of application No. 15/686,957, filed on Aug. 25, 2017, now Pat. No. 10,370,056.

(30) Foreign Application Priority Data

Sep. 29, 2016 (JP) ................. 2016-191957

(51) Int. Cl.
| | |
|---|---|
| *B62K 23/06* | (2006.01) |
| *B60T 7/10* | (2006.01) |
| *B62K 21/12* | (2006.01) |
| *B62M 25/08* | (2006.01) |
| *G05G 11/00* | (2006.01) |
| *H04W 76/10* | (2018.01) |

(52) U.S. Cl.
CPC ............ *B62K 23/06* (2013.01); *B60T 7/10* (2013.01); *B62K 21/12* (2013.01); *B62M 25/08* (2013.01); *H04W 76/10* (2018.02); *G05G 11/00* (2013.01)

(58) Field of Classification Search
CPC ........ B62K 23/06; B62K 23/02; B62K 11/14; B62K 21/12; B62M 25/08; B60T 7/10; G05G 11/00
See application file for complete search history.

(56) References Cited

U.S. PATENT DOCUMENTS

| | | | |
|---|---|---|---|
| 8,042,427 B2* | 10/2011 | Kawakami | B62K 23/06 74/502.2 |
| 8,909,424 B2 | 12/2014 | Jordan et al. | |
| 9,073,596 B2 | 7/2015 | McLaughlin et al. | |
| 2005/0109577 A1* | 5/2005 | Uno | B62M 25/08 192/217 |
| 2005/0229735 A1* | 10/2005 | Fujii | B62M 25/08 74/473.3 |
| 2007/0137361 A1* | 6/2007 | Fujii | H01H 21/24 74/473.13 |

(Continued)

FOREIGN PATENT DOCUMENTS

CN 101746466 A 6/2010

*Primary Examiner* — Daniel D Yabut
(74) *Attorney, Agent, or Firm* — Global IP Counselors LLP; David Tarnoff

(57) ABSTRACT

A bicycle operation device includes a clamp, an operation unit and a wireless communicator. The clamp is attachable to a handlebar of a bicycle. The operation unit includes a housing having an upper housing portion and a lower housing portion. The upper housing portion is located above the lower housing portion in a state in which the bicycle operation device is attached to the handlebar. The wireless communicator is configured to communicate with a bicycle component. The wireless communicator is provided on the upper housing portion.

17 Claims, 8 Drawing Sheets

(56) References Cited

U.S. PATENT DOCUMENTS

| | | | |
|---|---|---|---|
| 2008/0230664 A1* | 9/2008 | Sean | B62M 25/04 |
| | | | 248/214 |
| 2009/0315692 A1* | 12/2009 | Miki | B62K 23/02 |
| | | | 340/432 |
| 2011/0320093 A1* | 12/2011 | Kitamura | B62M 25/08 |
| | | | 701/51 |
| 2012/0253600 A1* | 10/2012 | Ichida | B62K 19/36 |
| | | | 701/37 |
| 2013/0221713 A1 | 8/2013 | Pelot et al. | |
| 2013/0276568 A1* | 10/2013 | Burato | B62M 25/08 |
| | | | 74/473.12 |
| 2014/0137696 A1* | 5/2014 | Kosaka | B62K 23/06 |
| | | | 74/523 |
| 2014/0352478 A1* | 12/2014 | Gao | B62M 25/08 |
| | | | 74/488 |
| 2015/0000452 A1 | 1/2015 | Hirotomi et al. | |
| 2015/0000455 A1 | 1/2015 | Hirotomi et al. | |
| 2015/0291248 A1* | 10/2015 | Fukao | B62J 1/08 |
| | | | 74/501.6 |
| 2017/0050702 A1 | 2/2017 | Grassi et al. | |
| 2018/0127058 A1 | 5/2018 | Rodgers | |
| 2018/0257736 A1 | 9/2018 | Komatsu et al. | |
| 2018/0257737 A1 | 9/2018 | Komatsu et al. | |

\* cited by examiner

BICYCLE OPERATION DEVICE

CROSS-REFERENCE TO RELATED APPLICATIONS

This application is a continuation application of U.S. application Ser. No. 15/686,957, filed Aug. 25, 2017, which claims priority to Japanese Patent Application No. 2016-191957, filed on Sep. 29, 2016. The entire disclosures of U.S. application Ser. No. 15/686,957 and Japanese Patent Application No. 2016-191957 are hereby incorporated herein by reference.

BACKGROUND

Field of the Invention

The present invention generally relates to a bicycle operation device.

Background Information

A bicycle operation device is known in the art that includes a wireless communication unit for communicating with a bicycle component. One example of a bicycle operation device includes a clamp attached to a handlebar of a bicycle, an operation unit integrally coupled to the clamp, and a wireless communicator arranged in the operation unit. U.S. Pat. No. 8,909,424 discloses one example of a known bicycle operation device.

SUMMARY

It is preferred that the position of the operation unit relative to the handlebar be easy to adjust. One object of the present disclosure is to provide a bicycle operation device that allows for easy adjustment of the position of the operation unit relative to the handlebar.

In accordance with an aspect of the present disclosure, a bicycle operation device includes a clamp, an operation unit and a wireless communicator. The clamp is attachable to a handlebar of a bicycle. The operation unit includes a housing having an upper housing portion and a lower housing portion. The upper housing portion is located above the lower housing portion in a state in which the bicycle operation device is attached to the handlebar. The wireless communicator is configured to communicate with a bicycle component. The wireless communicator is provided on the upper housing portion.

Thus, the position of the operation unit relative to the handlebar is easy to adjust.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
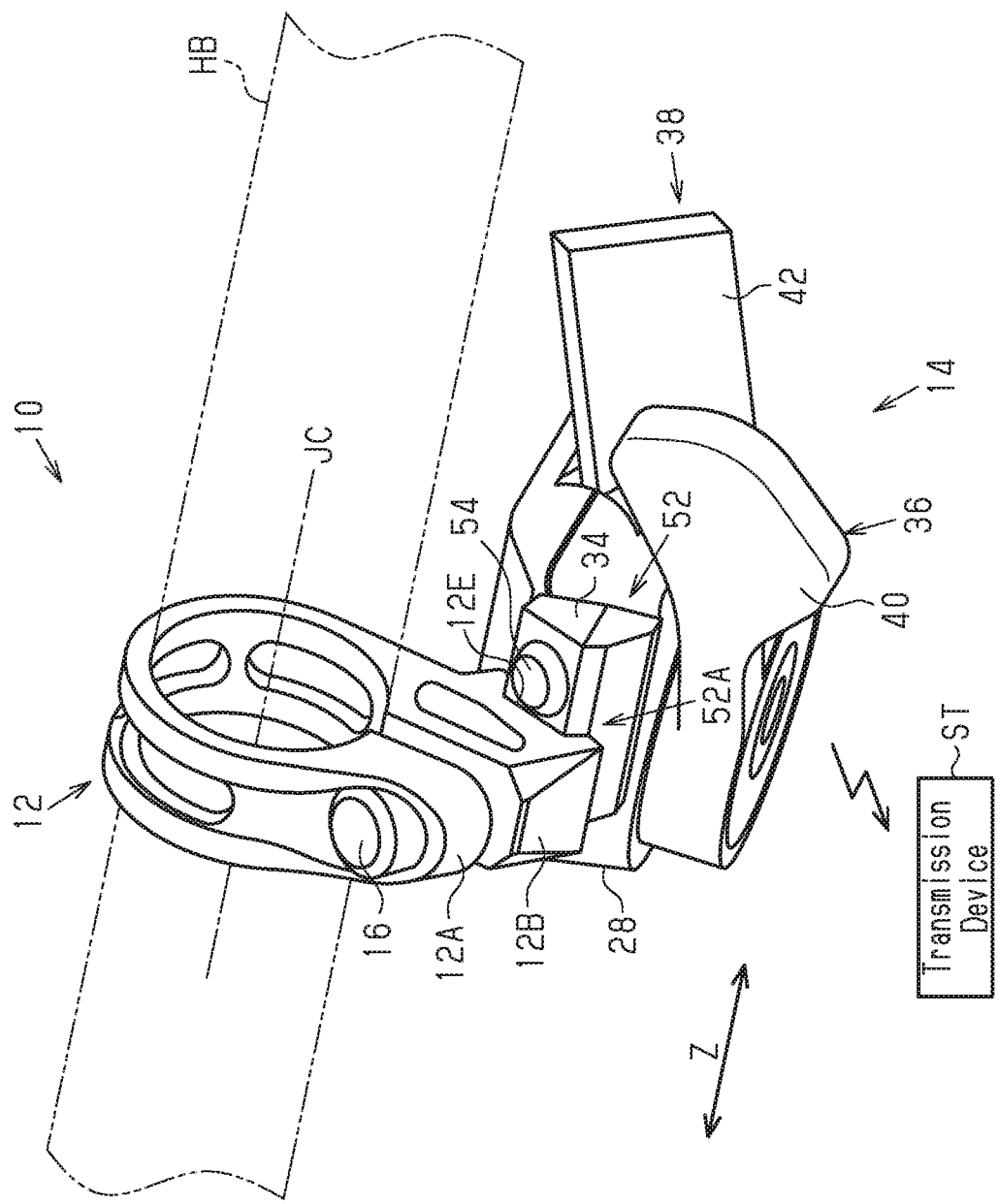
FIG. 1 is a perspective view of a bicycle operation device in accordance with a first embodiment.

Referring to FIG. 1, a bicycle operation device 10 is attached to a handlebar HB of, for example, a mountain bike. The bicycle operation device 10 includes a clamp 12 and an operation unit 14. The clamp 12 is attachable to the handlebar HB of a bicycle. The operation unit 14 is attachable to the clamp 12. In further detail, the operation unit 14 is attachable to the clamp 12 in a manner allowing for removal of the operation unit 14 from the clamp 12 and adjustment of the position of the operation unit 14 relative to the clamp 12. One example of the operation unit 14 is a shifter that operates a transmission device ST. The transmission device ST includes at least one of a front transmission device and a rear transmission device.

Figure 2:
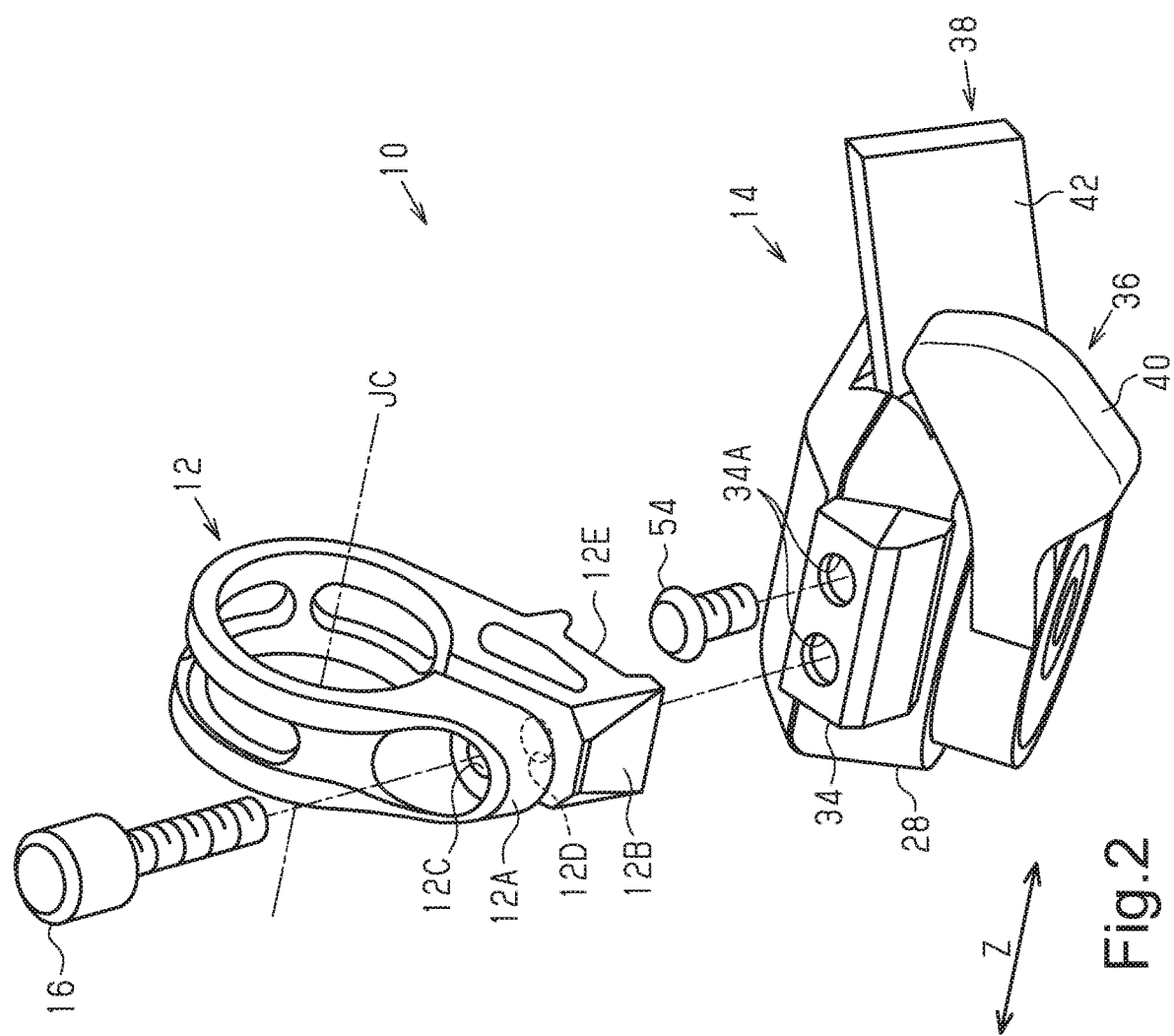
FIG. 2 is an exploded perspective view showing the bicycle operation device of FIG. 1.

As shown in FIG. 2, the bicycle operation device 10 further includes a coupling member 16. The clamp 12 is generally C-shaped in a side elevational view. The clamp 12 includes a first end 12A and a second end 12B. The first end 12A and the second end 12B are opposed to each other. The first end 12A includes a first insertion hole 12C into which the coupling member 16 is insertable. The second end 12B includes a second insertion hole 12D into which the coupling member 16 is insertable. In other words, the first and second insertion holes 12C and 12D each receives the coupling member 16. The coupling member 16 is configured to adjust the distance between the first end 12A and the second end 12B. The operation unit 14 is attachable to the clamp 12 by the coupling member 16. One example of the coupling member 16 is a bolt (i.e., a threaded fastener). The second end 12B includes a recess 12E. The recess 12E extends in an axial direction Z of the clamp 12. The axial direction Z of the clamp 12 is a direction extending along the axis JC of the clamp 12. The recess 12E includes two ends in the axial direction Z that are open in the axial direction Z. The recess 12E includes the second insertion hole 12D.

Figure 3:
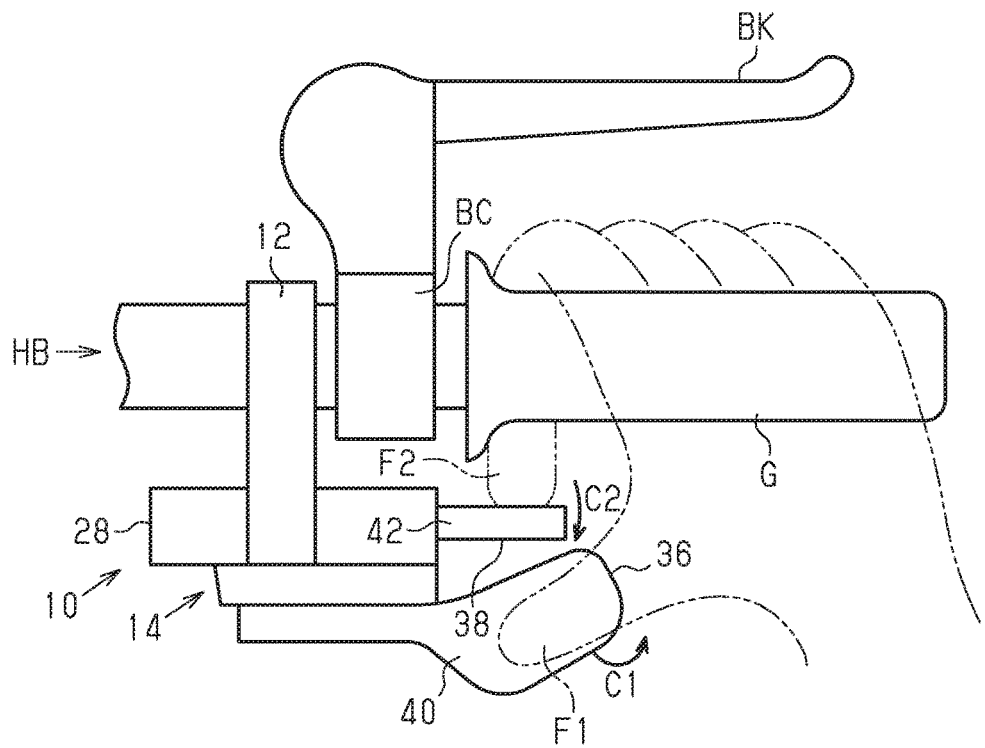
FIG. 3 is a plan view showing the bicycle operation device of FIG. 1 in a state attached to a handlebar.
Figure 4:
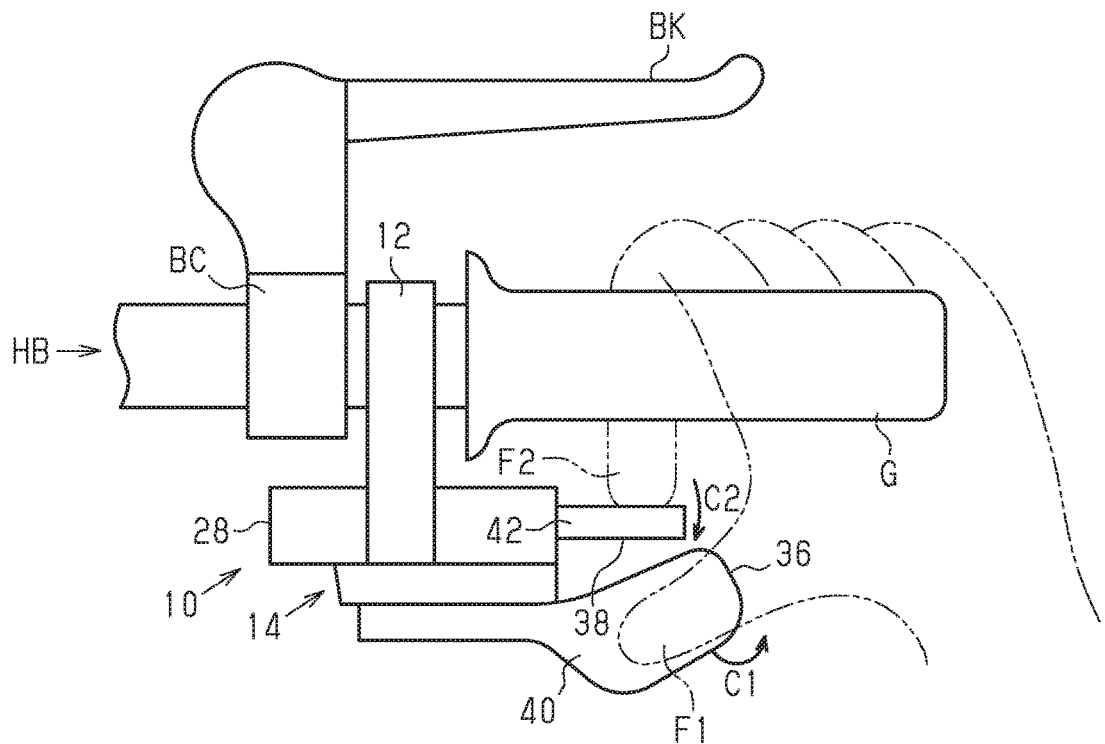
FIG. 4 is a simplified top plan view showing the bicycle operation device of FIG. 1 in a state attached to a handlebar.

As shown in FIGS. 3 and 4, the clamp 12 is separate from a brake clamp BC that attaches a brake operation unit BK of the bicycle to the handlebar HB. The clamp 12 can take, for example, a first attachment state shown in FIG. 3 and a second attachment state shown in FIG. 4. In the first attachment state, the clamp 12 is attached to the handlebar HB closer to a stem (not shown) than the brake clamp BC. In the second attachment state, the clamp 12 is attached to the handlebar HB closer to a grip G than the brake clamp BC.

Figure 5:
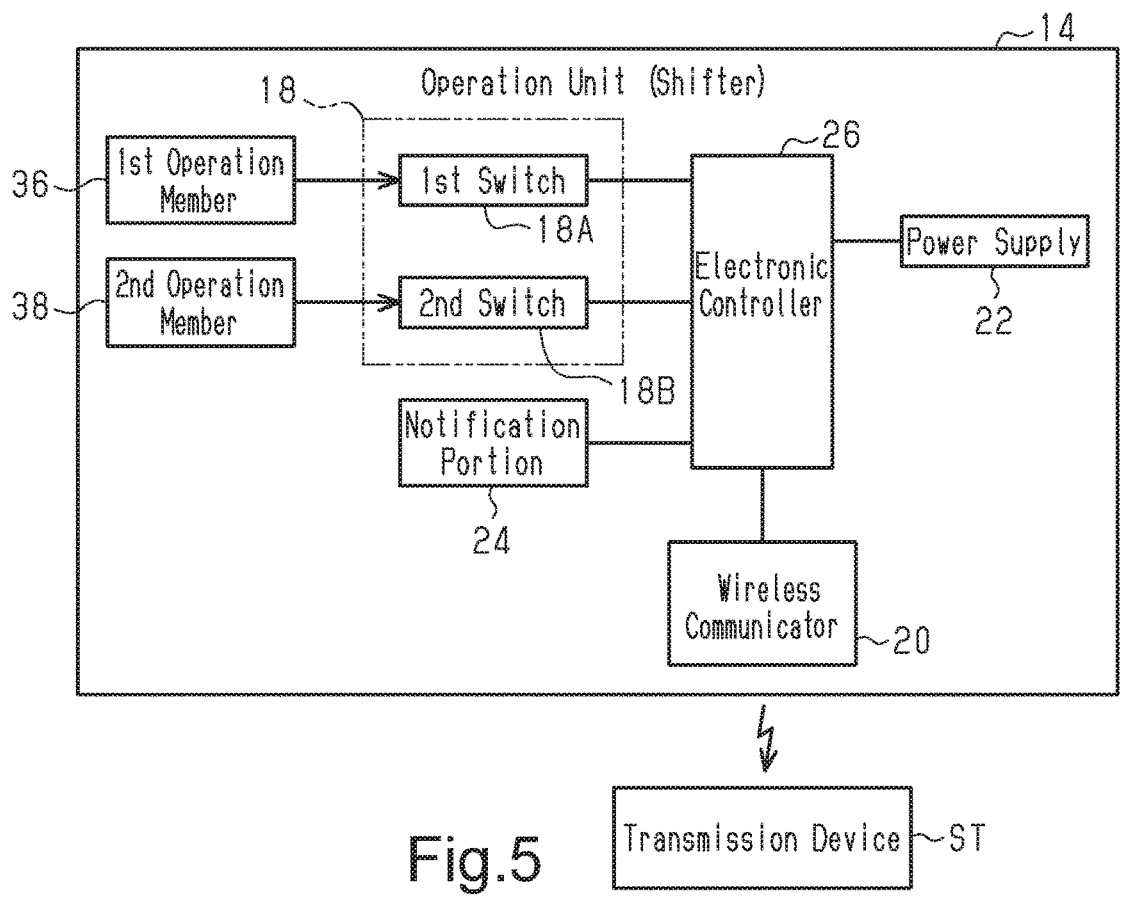
FIG. 5 is a block diagram showing an electrical configuration of an operation unit in the bicycle operation device of FIG. 1.

As shown in FIG. 5, the operation unit 14 includes an electric switch 18. The operation unit 14 further includes a wireless communicator 20, a power supply 22, a notification portion 24 and an electronic controller 26. The electronic controller 26 (hereinafter "the controller 26") includes, for example, a microprocessor. The controller 26 includes one or more processors units and one or more computer memory devices. The controller 26 can also include general circuits such as an input interface circuit and an output interface circuit. The wireless communicator 20 is configured to communicate with the transmission device ST (refer to FIG. 1), which is one example of a bicycle component. The wireless communicator 20 includes an antenna. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field.

The power supply 22 is connected by electric wires (not shown) to the electric switch 18, the wireless communicator 20, the notification portion 24 and the electronic controller 26. The power supply 22 supplies power via the electronic controller 26 to the wireless communicator 20. The notification portion 24 outputs information. The information includes, for example, information related to the operation unit 14 and/or information input to the bicycle operation device 10 from an external device. The notification portion 24 includes, for example, an LED or a buzzer. In other words, the term "notification portion" refers a physical device that outputs at least one of a haptic notification, a visual notification and an audio notification.

The electric switch 18 is configured to transmit signals to the wireless communicator 20. The electric switch 18 includes a first switch 18A and a second switch 18B. The switches 18A and 18B each output an ON signal to the electronic controller 26. In a case in which the controller 26 receives an ON signal from the switch 18A or 18B, the electronic controller 26 outputs a control signal that corresponds to the received ON signal to the wireless communicator 20. The wireless communicator 20 outputs the received control signal to, for example, the transmission device ST. In a further example, the electric switch 18 directly transmits signals to the wireless communicator 20.

Figure 6:
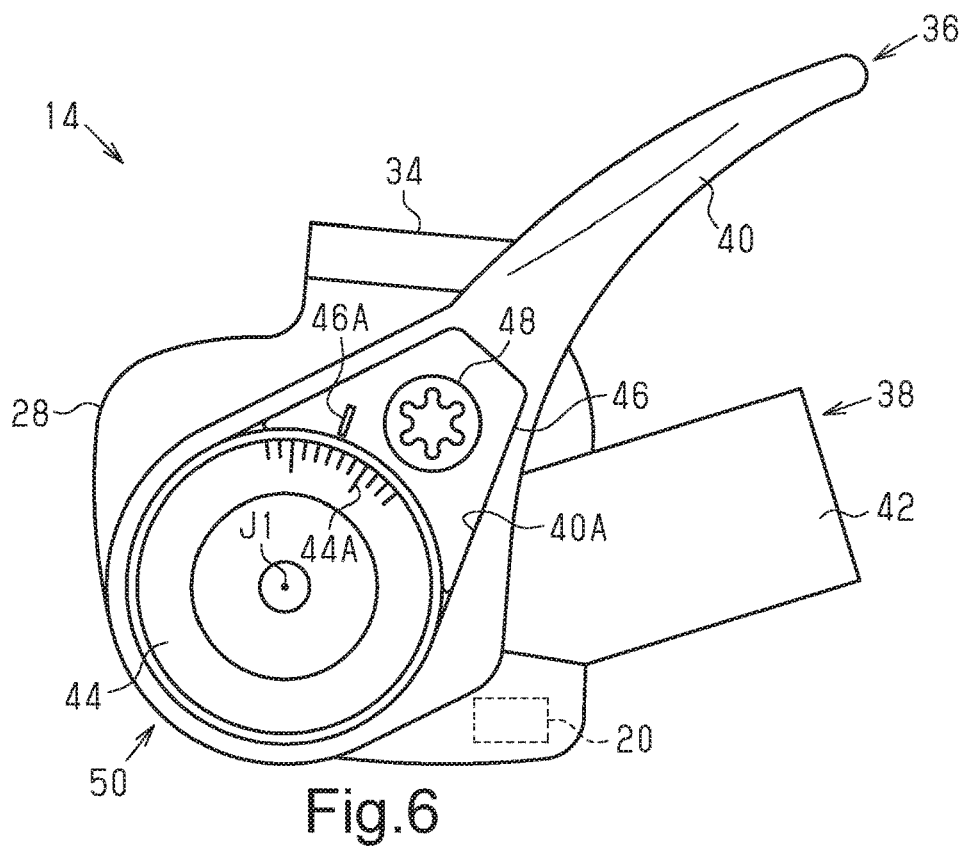
FIG. 6 is a front elevational view of the operation unit showing a second operation member.

As shown in FIG. 6, the operation unit 14 further includes a housing 28. The housing 28 accommodates the wireless communicator 20. The housing 28 further accommodates the electric switch 18, the power supply 22, the notification portion 24 and the electronic controller 26 (all shown in FIG. 4). The wireless signals (e.g., radio waves) output from the wireless communicator 20 are transmitted through the housing 28. The housing 28 includes, for example, resin material that allows the wireless signals to pass therethrough.

The housing 28 includes a rear housing portion 28A, which is the rear half of the housing 28, and a front housing portion 28B, which is the front half of the housing 28. Further, the housing 28 includes an upper housing portion 28C and a lower housing portion 28D. The upper housing portion 28C is the upper half of the housing 28. The lower housing portion 28D is the lower half of the housing 28.

Figure 7:
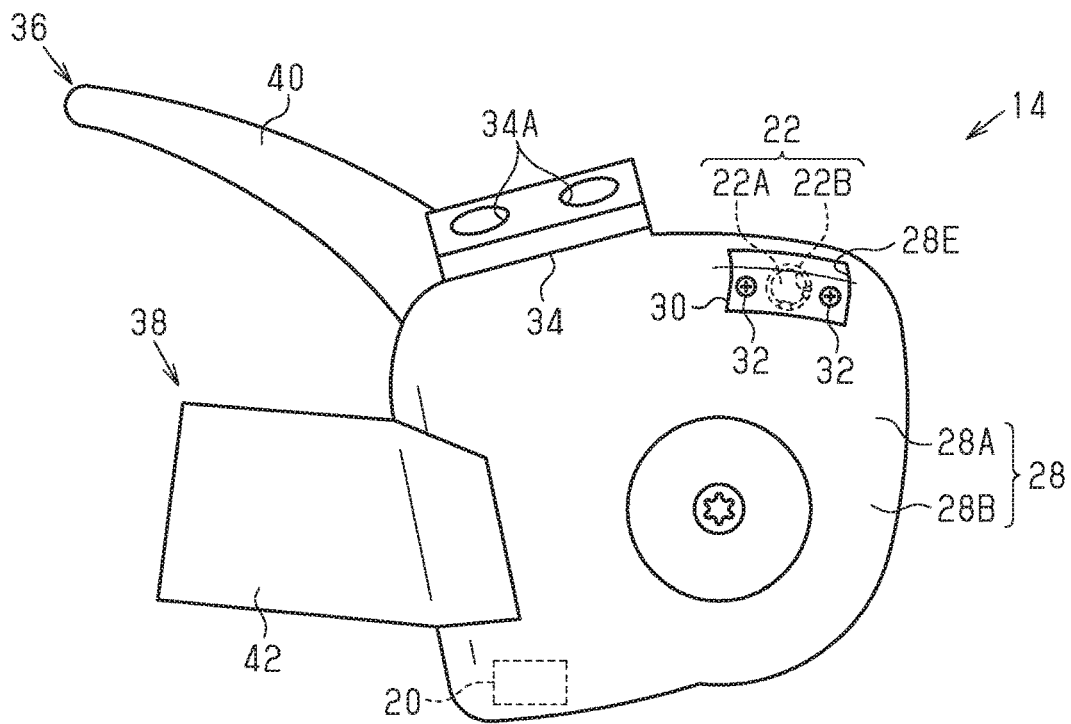
FIG. 7 is a rear elevational view of the operation unit showing the second operation member.
Figure 8:
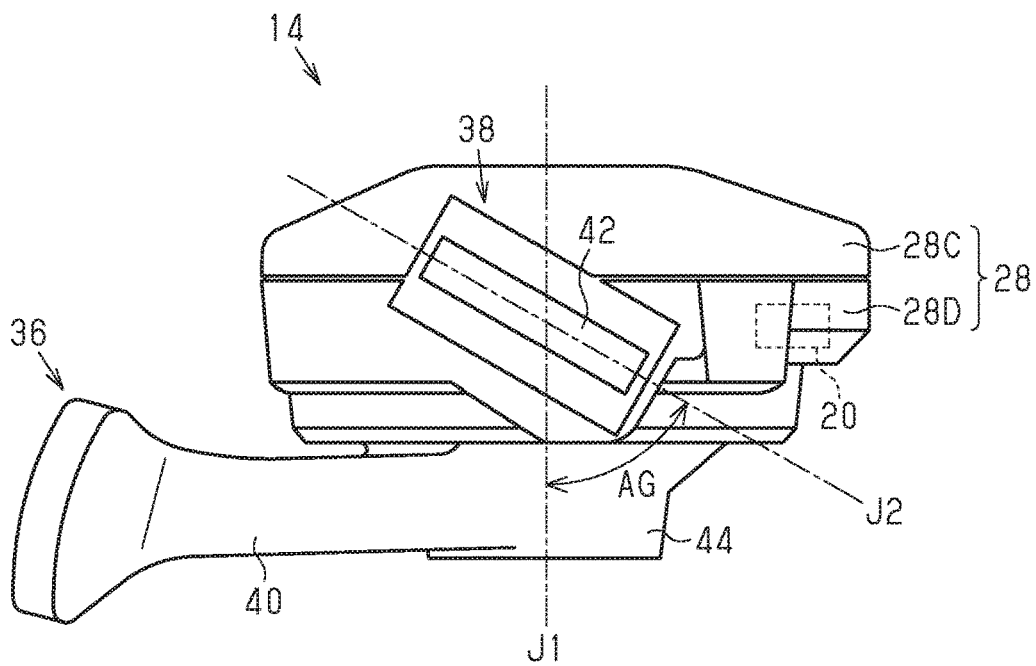
FIG. 8 is a side elevational view of the operation unit showing the second operation member.

As shown in FIG. 7, the wireless communicator 20 is accommodated in the front housing portion 28B. As shown in FIG. 8, the wireless communicator 20 is disposed in the front housing portion 28B and the lower housing portion 28D. The wireless communicator 20 is fixed to the housing 28. In a further example, the wireless communicator 20 is attached in a removable manner to the housing 28.

As shown in FIG. 7, the operation unit 14 includes an accommodation portion 28E and a power supply cover 30. The accommodation portion 28E is configured to at least partially accommodate the power supply 22. The accommodation portion 28E shown in FIG. 7 entirely accommodates the power supply 22. The accommodation portion 28E is arranged in the rear housing portion 28B and the lower housing portion 28D (refer to FIG. 8). The power supply 22 includes a battery 22A and a battery holder 22B. The battery 22A is attached in a removable manner to the battery holder 22B. The power supply cover 30 at least partially covers an opening of the accommodation portion 28E. The power supply cover 30 shown in FIG. 7 entirely covers the accommodation portion 28E. The power supply cover 30 is attached in a removable manner to the housing 28. The power supply cover 30 includes a plurality of bolts 32. The bolts 32 couple the power supply cover 30 to the housing 28.

The operation unit 14 further includes a projection 34. The projection 34 is fixed to the housing 28. In one example, the projection 34 is fixed to the rear housing portion 28B and the lower housing portion 28D. In another example, the projection 34 is attached in a removable manner to the housing 28. The projection 34 and the housing 28 are formed from different materials. One example of the material of the projection 34 is aluminum. The projection 34 includes fastening holes 34A. In one example, the projection 34 includes two fastening holes 34A. The fastening holes 34A each include a threaded wall surface. The coupling member 16 is coupled to one of the fastening holes 34A. In this manner, the operation unit 14 includes the fastening holes 34A, and the coupling member 16 is fastened to one of the fastening holes 34A.

The operation unit 14 includes a first operation member 36, which operates the first switch 18A, and a second operation member 38, which operates the second switch 18B. The first operation member 36 is operated to perform, for example, upshifting. The second operation member 38 is operated to perform, for example, downshifting. The second operation member 38 further includes an elastic member (not shown). The elastic member applies a force to the second operation member 38 that returns the second operation member 38 to its original position. One example of the elastic member is a coil spring.

As shown in FIG. 8, the first operation member 36 includes a first lever 40. The first lever 40 is pivotal about a first axis J1. The first lever 40 is pivoted along a first movement plane that is orthogonal to the first axis J1. The second operation member 38 includes a second lever 42. The second lever 42 is pivotal about a second axis J2. The second lever 42 is pivoted along a second movement plane that is orthogonal to the second axis J2. The angle AG formed by the first movement plane and the second movement plane is 20° or greater and 70° or less. In one example, the angle AG is 60°.

As shown in FIG. 6, the first operation member 36 includes a rotational member 44, two coupling portions 46 and a bolt 48. The first lever 40 includes an accommodation portion 40A. The accommodation portion 40A accommodates the rotational member 44, the two coupling portions 46 and the bolt 48. The first operation member 36 further includes an elastic member (not shown). The elastic member is arranged in the rotational member 44 to apply force to the first operation member 36 that returns the first operation member 36 to its original position. One example of the elastic member is a coil spring.

The axis of the rotational member 44 is aligned with the first axis J1. The rotational member 44 includes calibrations 44A used to adjust the initial position of the first operation member 36. In one example, the calibrations 44A are marked along the outer circumference of the surface of the rotational member 44. The coupling portions 46 are attached to the first lever 40 in a state accommodated in the accommodation portion 40A. The coupling portions 46 include a marking 46A used to adjust the initial position of the first operation member 36. The coupling portions 46 further include an elastic member (not shown). The bolt 48 is inserted into the coupling portions 46 to compress the elastic member, couple a portion of the compressed elastic member to the rotational member 44, and couple the coupling portions 46 to the rotational member 44. In this state, the first lever 40, the coupling portions 46, and the rotational member 44 are integrally rotated about the first axis J1.

The operation unit 14 further includes an operation position adjustment mechanism 50 that is configured to adjust the initial position of at least one of the first operation member 36 and the second operation member 38. The operation position adjustment mechanism 50 includes the first lever 40, the rotational member 44, the two coupling portions 46 and the bolt 48. The operation position adjustment mechanism 50 changes the rotational position of the first lever 40 relative to the rotational member 44 about the first axis J1 to adjust the initial position of the first operation member 36. By loosening the bolt 48 that is inserted into the coupling portions 46, the coupling portions 46 are uncoupled from the rotational member 44. In this state, the first lever 40 and the coupling portions 46 are rotated relative to the rotational member 44 about the first axis J1 to adjust the initial position of the first operation member 36.

Referring to FIGS. 3 and 4, the first operation member 36 is configured to be operated by a first finger F1 of a user. The second operation member 38 is configured to be operated by a second finger F2 of a user. If the first lever 40 is pushed in a first operation direction C1, then the first switch 18A (refer to FIG. 5) goes ON. If the first lever 40 is returned to the initial position, then the first switch 18A goes OFF. If the second lever 42 is pushed in a second operation direction C2, then the second switch 18B (refer to FIG. 5) goes ON. If the second lever 42 is returned to the initial position, then the second switch 18B goes OFF.

As shown in FIG. 1, the bicycle operation device 10 further includes a position adjustment mechanism 52. The position adjustment mechanism 52 is configured to adjust the position of the operation unit 14 in the axial direction Z. The position adjustment mechanism 52 includes a guide structure 52A that guides the operation unit 14 in the axial direction Z. The guide structure 52A includes the recess 12E and the projection 34 that extend in the axial direction Z. The recess 12E is arranged in the clamp 12. The projection 34 is arranged on the operation unit 14. The projection 34 is fitted to the recess 12E and slidable in the axial direction Z. In another example, the recess 12E is arranged in the operation unit 14, and the projection 34 is arranged on the clamp 12. A bolt 54 is fastened to the one of the two fastening holes 34A where the coupling member 16 is not fastened.

Modified Examples

It should be apparent to those skilled in the art that the present invention may be embodied in many other specific forms without departing from the spirit or scope of the invention. Particularly, it should be understood that the present invention may be embodied in the following forms.

Figure 9:
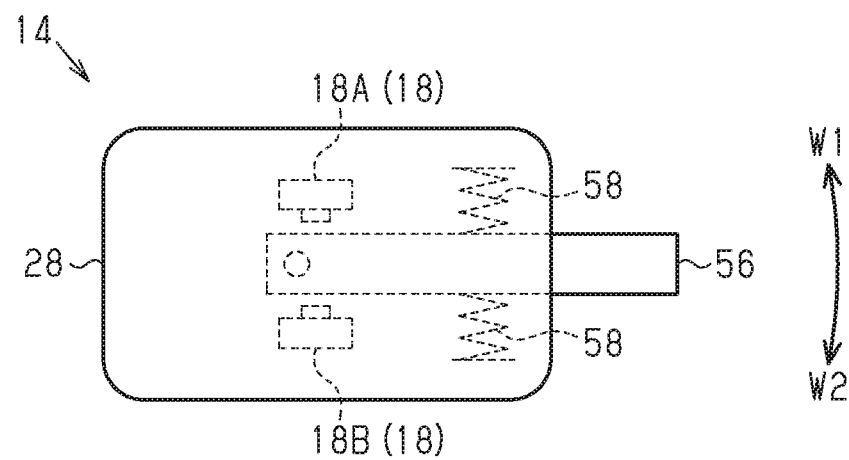
FIG. 9 is a front elevational view of the operation unit showing a first modification.

The configuration of the operation unit 14 may be changed in any manner. For example, as shown by a first modified example of FIG. 9, the operation unit 14 includes an operation lever 56. The operation unit 14 further includes two elastic members 58. The housing 28 includes the switches 18A and 18B. The switches 18A and 18B are located at opposite sides of the operation lever 56. The operation lever 56 is pivotal relative to the housing 28. The two elastic members 58 apply force to the operation lever 56 to return the operation lever 56 to a neutral position. The operation lever 56 is configured to operate the first switch 18A if operated in a first operation direction W1. The operation lever 56 is configured to operate the second switch 18B if operated in a second operation direction W2 that differs from the first operation direction W1.

Figure 10:
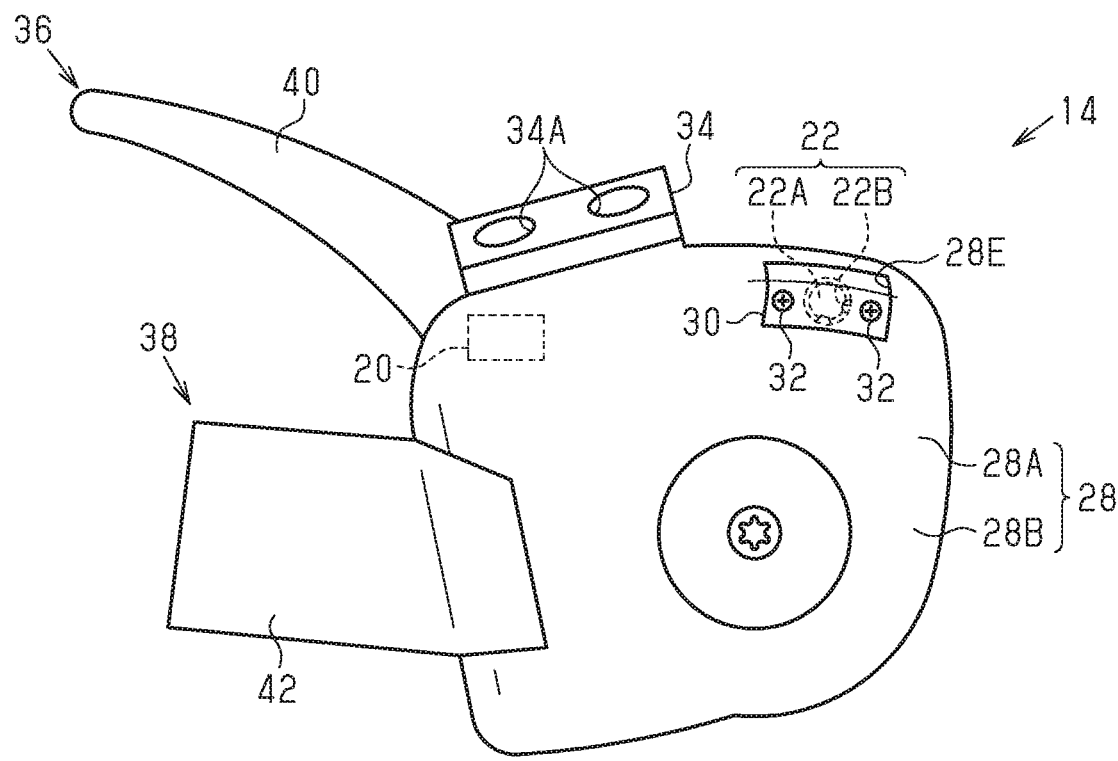
FIG. 10 is a rear elevational view of the operation unit showing a second modification.
Figure 11:
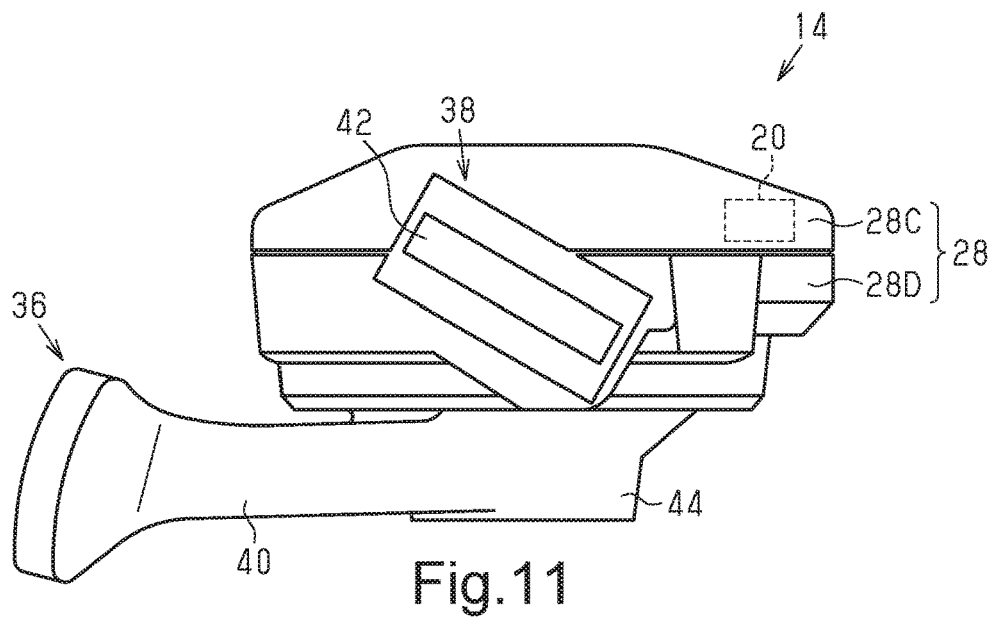
FIG. 11 is a side elevational view of the operation unit showing a third modification.

The location of the wireless communicator 20 in the housing 28 may be changed. In a first example, as shown by a second modified example of FIG. 10, the wireless communicator 20 is accommodated in the rear housing portion 28B of the housing 28. In a second example, as shown by a third modified example of FIG. 11, the wireless communicator 20 is accommodated in the upper housing portion 28C of the housing 28.

Figure 12:
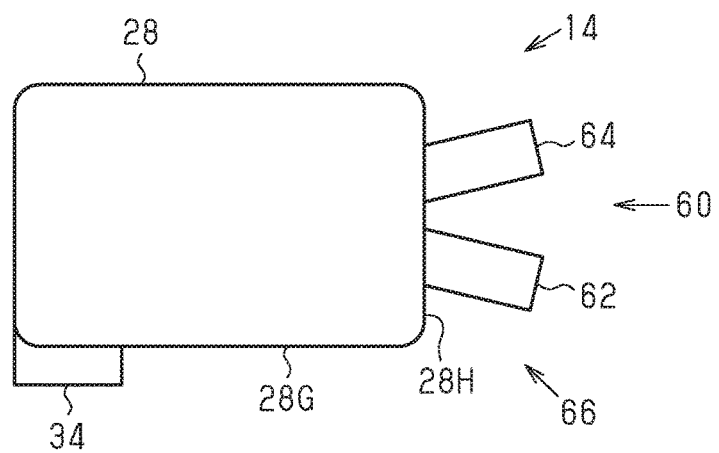
FIG. 12 is a top plan view of the operation unit showing a fourth modification.
Figure 13:
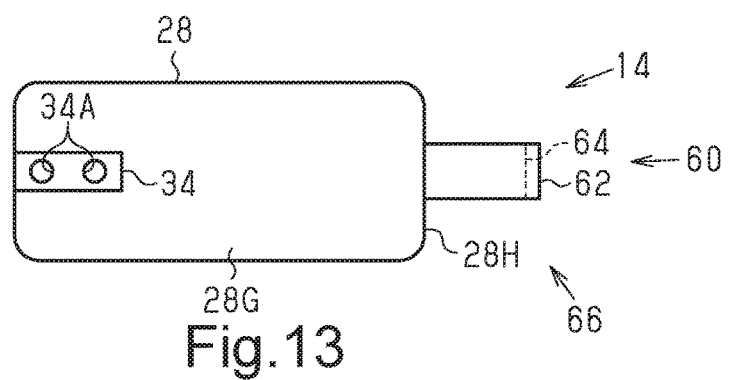
FIG. 13 is a top plan view of the operation unit of FIG. 12.

The configuration of the operation unit 14 can be changed in any manner. For example, as shown by a fourth modified example of FIGS. 12 and 13, the operation unit 14 includes operation members 60. The operation members 60 include a first operation member 62 and a second operation member 64. The operation unit 14 further includes a reversing structure 66 that allows the operation members 60 to be arranged on one side of the clamp 12 or the other side of the clamp 12 with respect to the axial direction Z of the clamp 12. The operation unit 14 can be arranged at a first position or a second position. The first position is located at a right side of a bicycle center plane that extends in a front-rear direction of the bicycle. The second position is located at a left side of the bicycle center plane. At the first position, the clamp 12 is attached to the right side of the handlebar HB. At the second position, the clamp 12 is attached to the left side of the handlebar HB. The reversing structure 66 sets the relationship of the operation unit 14 at the first position and the operation unit 14 at the second position to a plane-symmetric relationship with respect to the bicycle center plane. As shown in FIG. 12, the housing 28 includes a first side surface 28G and a second side surface 28H. The first side surface 28G extends in the longitudinal direction of the handlebar HB at the side facing the clamp 12. The second side surface 28H extends in the height-wise direction of the housing 28 and intersects a direction parallel to the longitudinal direction of the handlebar HB. The operation members 62 and 64 are arranged in the housing 28 to project from the second side surface 28H of the housing 28 at the central portion in the widthwise direction of the housing 28. The projection 34 is arranged on the first side surface 28G at the central portion in the widthwise direction of the housing 28.

Figure 14:
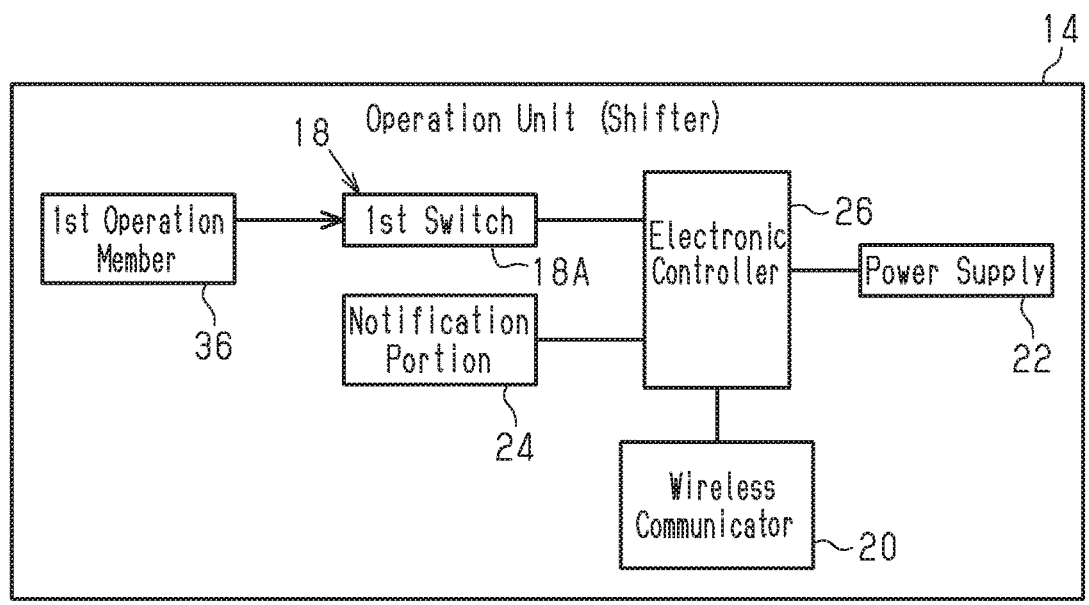
FIG. 14 is a block diagram showing the electrical configuration of a fifth modification.
Figure 15:
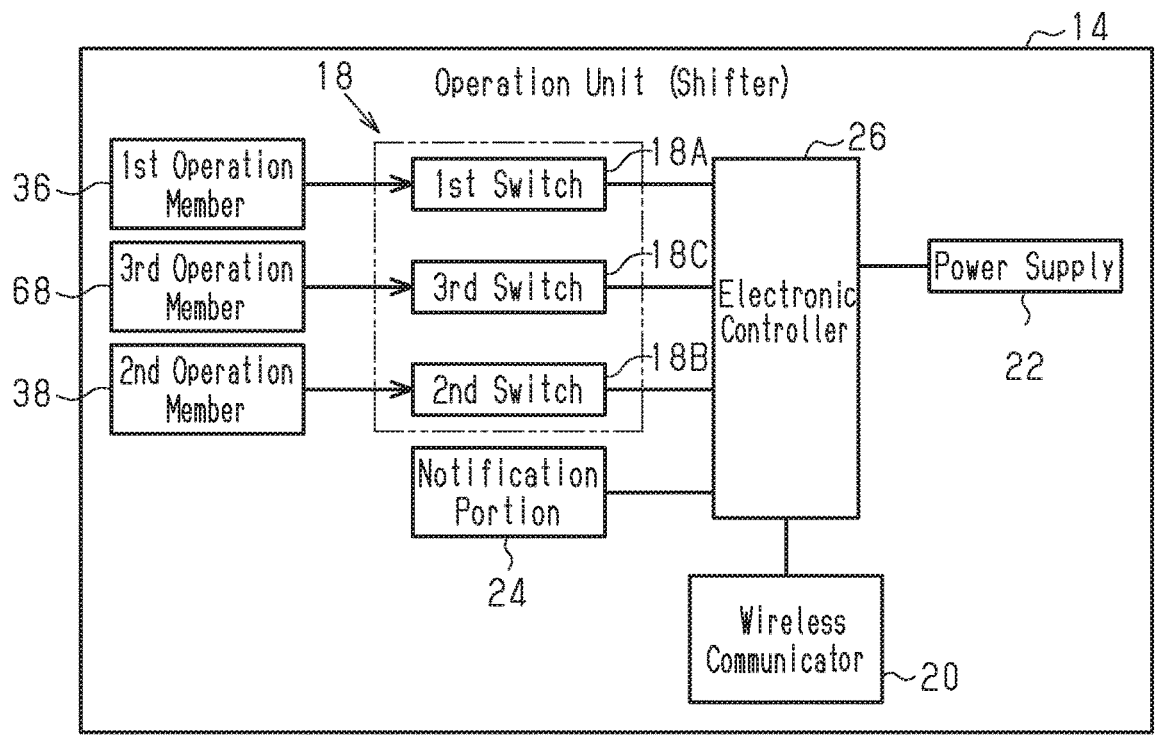
FIG. 15 is a block diagram showing the electrical configuration of a sixth modification.

The quantity of the electric switch 18 in the operation unit 14 may be changed as required. In a first example, as shown by a fifth example of FIG. 14, the electric switch 18 includes only the first switch 18A. In this case, the operation unit 14 further includes the first operation member 36 to operate the first switch 18A. In a second example, as shown by a sixth modified example of FIG. 15, the electric switch 18 includes the first switch 18A, the second switch 18B, and a third switch 18C. In this case, the operation unit 14 further includes a third operation member 68 to operate the third switch 18C. The third operation member 68 is arranged on, for example, the first operation member 36 at a location separated from the operation plane of the first operation member 36. One example of a position separated from the operation plane is a plane located at a rear side of the operation plane of the first lever 40. The third operation member 68 is operated, for example, to pair the bicycle operation device 10 with a bicycle component. In one example, the bicycle operation device 10 attached to the right side of the handlebar HB is configured to be paired with one of the front transmission device and the rear transmission device. The bicycle operation device 10 attached to the left side of the handlebar HB is configured to be paired with the other one of the front transmission device and the rear transmission device.

The bicycle component associated with the operation unit 14 of the bicycle operation device 10 may be changed in any manner. In a first example, the operation unit 14 is operated to switch the operational state of an electric suspension. One of the first operation member 36 and the second operation member 38 is operated to hold the electric suspension in a lock-out state and to cancel the lock-out state of the electric suspension. In a second example, the operation unit 14 is operated to adjust the height of an electric seatpost. One of the first operation member 36 and the second operation member 38 is operated to increase the height of the electric seatpost. The other one of the first operation member 36 and the second operation member 38 is operated to decrease the height of the electric seatpost. In a third example, the operation unit 14 is operated to operate the transmission device ST or the electric suspension and the electric seatpost. In a first specific example of the third example, one of the first operation member 36 and the second operation member 38 is operated to switch the operational state of the electric suspension. The other one of the first operation member 36 and the second operation member 38 is operated to operate the front transmission device. In a second specific example of the third example, one of the first operation member 36 and the second operation member 38 is operated to adjust the height of the electric seatpost. The other one of the first operation member 36 and the second operation member 38 is operated to operate the front transmission device. In a third specific example of the third example, in addition to the first operation member 36 and the second operation member 38, the operation unit 14 includes a further operation member. One example of a further operation member is a third operation member 68 shown in FIG. 15. In one example related to the third specific example, one of the first operation member 36 and the second operation member 38 is operated to perform upshifting of the transmission device ST. The other one of the first operation member 36 and the second operation member 38 is operated to perform downshifting of the transmission device ST. The third operation member 68 is operated to switch the operation state of the electric suspension or adjust the height of the electric seatpost.

The configuration of the housing 28 may be changed in any manner. In one example, the housing 28 includes the upper housing portion 28C and the lower housing portion 28D that are separately formed. A joining means joins the upper housing portion 28C and the lower housing portion 28D to form the housing 28. The housing 28 may have, for example, a first configuration or a second configuration. In the first configuration, the lower housing portion 28D includes the accommodation portion 28E. Instead of the power supply cover 30 shown in FIG. 7, the upper housing portion 28C forms a power supply cover that protects the power supply 22. The power supply cover 30 is omitted. In the second configuration, the upper housing portion 28C includes the accommodation portion 28E. Instead of the power supply cover 30 shown in FIG. 7, the lower housing portion 28D forms a power supply cover that protects the power supply 22. The power supply cover 30 is omitted. The joining means includes, for example, a bolt or a fitting structure. When the joining means includes a bolt, the upper housing portion 28C and the lower housing portion 28D are fastened together by the bolt to form the housing 28. When the joining means includes a fitting structure, a projection arranged on one of the upper housing portion 28C and the lower housing portion 28D is fitted to a recess arranged in the other one of the upper housing portion 28C and the lower housing portion 28D to form the housing 28.

The structure for fastening the operation unit 14 to the clamp 12 can be changed in any manner. In a first example, the operation unit 14 includes the fastening holes 34A that extend through the projection 34. The bicycle operation device 10 further includes a first nut (not shown). The coupling member 16 is inserted into one of the fastening holes 34A. The distal end of the coupling member 16 projects into the housing 28 through the fastening hole 34A. The first nut is fastened to the distal end of the coupling member 16. In a second example, the operation unit 14 includes the coupling member 16. The coupling member 16 is a tube or rod formed integrally with the projection 34 or a tube or rod fixed to the projection 34. The coupling member 16 includes a male thread (not shown). The male thread is formed on the outer circumferential surface of the coupling member 16. The clamp 12 includes a female thread (not shown) mated with the coupling member 16. The female thread is formed on, for example, a wall surface of at least one of insertion holes 12C and 12D. The male thread of the coupling member 16 is mated with the female thread of the clamp 12 to fix the operation unit 14 to the clamp 12. In a third example, the bicycle operation device 10 of the second example further includes a second nut (not shown). The distal end of the coupling member 16 projects through the first insertion hole 12C and out of the clamp 12. The second nut is fastened to the distal end of the coupling member 16.

What is claimed is:

1. A bicycle operation device comprising:
    an electronic controller programmed to output a control signal;
    an electric switch including a first switch and a second switch, the first and second switches each outputting an ON signal to the electronic controller, the ON signal corresponding to the control signal;
    an operation unit including a housing having an upper housing portion and a lower housing portion, the upper housing portion being located above the lower housing portion in a state in which the bicycle operation device is attached to a handlebar of the bicycle, the operating unit further having an operation member configured to operate the first switch when operated in a first operation direction, the operation member is further configured to operate the second switch when operated in a second operation direction, the second operation direction is different from the first operation direction, the operation member being biased to a neutral position by an elastic member, the elastic member being arranged between the housing and the operation member, the operation unit including a projection, the projection having a fastening hole to receive a fastener to fasten the operation unit to a clamp of the bicycle operation device;

a wireless communicator configured to receive the control signal from the electronic controller and being further configured to communicate the control signal to a bicycle component; and, a power supply configured to supply power to the wireless communicator, the power apply being provided in the upper housing, the power supply being closer to the projection than the wireless communicator in a state where the bicycle operation device is attached to the handlebar of the bicycle.

2. The bicycle operation device according to claim 1, wherein
the clamp is connected to the housing and is attachable to the handlebar.

3. The bicycle operation device according to claim 2, wherein
the fastener is a bolt, and the clamp has an insertion hole for receiving the bolt such that the operation unit is attachable to the clamp by the bolt.

4. The bicycle operation device according to claim 3, wherein
the projection is fixed to the housing, the fastening hole for fastening the operation unit to the bolt.

5. The bicycle operation device according to claim 2, wherein
the clamp includes a first end and a second end,
the first end includes a first insertion hole that receives a bolt,
the second end including a second insertion hole that receives the bolt, and
the operation unit being attached to the clamp by the bolt.

6. The bicycle operation device according to claim 2, wherein
the clamp is separate from a brake clamp that attaches a brake operation unit of the bicycle to the handlebar.

7. The bicycle operation device according to claim 1, wherein
the operation unit further includes the electric switch configured to transmit a signal to the wireless communicator.

8. The bicycle operation device according to claim 7, wherein
the electric switch includes the first switch and the second switch.

9. The bicycle operation device according to claim 1, wherein
the upper housing portion and the lower housing portion are separately formed and joined to form the housing.

10. The bicycle operation device according to claim 1, wherein
the housing includes a resin material.

11. The bicycle operation device according to claim 1, wherein
the operation member is pivotal about an axis about the upper housing portion.

12. The bicycle operation device according to claim 1, wherein
the operation unit further includes an accommodation portion, the accommodation portion is configured to at least partially accommodate the power supply.

13. The bicycle operation device according to claim 12, wherein
the upper housing portion includes the accommodation portion.

14. The bicycle operation device according to claim 12, wherein
the operation unit further includes a power supply cover, the power supply cover at least partially covers an opening the accommodation portion.

15. The bicycle operation device according to claim 14, wherein
the power supply cover is attached in a removable manner to the housing.

16. The bicycle operation device according to claim 1, wherein
the operation unit further includes a notification portion, the notification portion being output information, the information including information related to the operation unit and/or information input to the bicycle operation device from an external device.

17. The bicycle operation device according to claim 16, wherein
the notification portion is disposed to the housing.

* * * * *